US010693882B2

(12) United States Patent
Gordon et al.

(10) Patent No.: US 10,693,882 B2
(45) Date of Patent: Jun. 23, 2020

(54) RESOURCE-BASED SELECTION OF IDENTITY PROVIDER

(71) Applicant: Microsoft Technology Liecensing, LLC, Redmond, WA (US)

(72) Inventors: Ariel Gordon, Kirkland, WA (US); Sarat Chandra Subramaniam, Bellevue, WA (US); Yordan I. Rouskov, Seattle, WA (US); Paul H. J. Garner, Seattle, WA (US); Benjamin R. Vincent, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 156 days.

(21) Appl. No.: 15/799,732

(22) Filed: Oct. 31, 2017

(65) Prior Publication Data

US 2019/0132325 A1    May 2, 2019

(51) Int. Cl.
*H04L 29/06* (2006.01)
*H04L 12/911* (2013.01)
*G06F 3/0484* (2013.01)

(52) U.S. Cl.
CPC .......... *H04L 63/102* (2013.01); *H04L 63/108* (2013.01); *H04L 63/126* (2013.01); *G06F 3/04842* (2013.01); *H04L 47/82* (2013.01); *H04L 63/0884* (2013.01)

(58) Field of Classification Search
CPC ............................ H04L 63/108; H04L 63/126
See application file for complete search history.

(56) References Cited

U.S. PATENT DOCUMENTS

| | | | | |
|---|---|---|---|---|
| 8,381,306 B2* | 2/2013 | McPherson | ......... | G06F 21/6218 726/26 |
| 9,721,117 B2* | 8/2017 | Pleau | .................. | H04L 63/0884 |
| 9,774,586 B1* | 9/2017 | Roche | ..................... | H04L 63/08 |
| 10,250,584 B2* | 4/2019 | Mikheev | ............. | H04L 63/0815 |
| 10,375,053 B2* | 8/2019 | Sridharan | ......... | H04L 63/0884 |
| 2013/0198824 A1* | 8/2013 | Hitchcock | .............. | G06F 21/00 726/6 |
| 2014/0032926 A1* | 1/2014 | Prem | ..................... | G06F 21/602 713/189 |

(Continued)

OTHER PUBLICATIONS

"International Search Report & Written Opinion Issued in PCT Application No. PCT/US18/057193", dated Jan. 14, 2019, 11 Pages.

*Primary Examiner* — Ali Shayanfar
(74) *Attorney, Agent, or Firm* — Workman Nydegger

(57) ABSTRACT

The automatic selection of an identity provider to be used to authenticate users when requesting to access network resources for a tenant. The authentication is initiated by checking the username against the directory of the tenant. If that check results in finding an entry for the username in that directory, the entry is checked for an identity provider. If that check results in finding an identity provider, the user is directed to that found identity provider for authentication. Thus, in many, most, or all cases, an identity provider is found and selected for authentication of the user without the user having to manually select the identity provider. The username may be an internal user of an entity. The selection of the identity provider works in either case since there would still be an entry for that user in the directory of the tenant.

19 Claims, 4 Drawing Sheets

Computing System
*100*

(56) References Cited

U.S. PATENT DOCUMENTS

| | | | |
|---|---|---|---|
| 2014/0090037 A1* | 3/2014 | Singh | H04L 63/0815 |
| | | | 726/7 |
| 2014/0130142 A1* | 5/2014 | Plewnia | G06F 21/335 |
| | | | 726/5 |
| 2015/0200958 A1* | 7/2015 | Muppidi | H04L 63/10 |
| | | | 726/23 |
| 2015/0264020 A1* | 9/2015 | Ackerly | H04L 63/0428 |
| | | | 713/168 |
| 2015/0324846 A1* | 11/2015 | Feldman | G06Q 30/0256 |
| | | | 705/14.54 |
| 2015/0378769 A1* | 12/2015 | Buck | H04L 63/08 |
| | | | 718/1 |
| 2017/0201549 A1* | 7/2017 | Vincent | H04L 63/20 |
| 2017/0235936 A1* | 8/2017 | de los Rios | G06F 21/36 |
| | | | 726/19 |
| 2017/0339156 A1* | 11/2017 | Gupta | G06F 21/6218 |
| 2018/0115551 A1* | 4/2018 | Cole | H04L 63/10 |
| 2018/0165661 A1* | 6/2018 | Macht | G06Q 20/4014 |
| 2018/0183619 A1* | 6/2018 | Jayaram | H04L 51/16 |
| 2019/0068572 A1* | 2/2019 | Wong | H04L 63/083 |
| 2019/0149579 A1* | 5/2019 | Kakumani | H04L 63/08 |
| | | | 726/1 |
| 2019/0230073 A1* | 7/2019 | Patel | G06F 16/24578 |

* cited by examiner

RESOURCE-BASED SELECTION OF IDENTITY PROVIDER

BACKGROUND

Computing systems and associated networks have greatly revolutionized our world. One of the key benefits obtained from computing systems is the ability to access resources over a network. In order to securely provide access to network resource, the type and extent of access to a network resource is often controlled via what is often termed generally as "authorization". Authorization matches up users with particular authority to access the network resource. However, this relies upon the user providing proper proof that the entity requesting access has a particular identity. This initial proving up of identity is often termed "authentication".

During authentication, the user providers their username, which is any identifier that identifies that user. An identity provider is then used to match up that username against its entries. The presence of the entry will trigger the identity provider to go through the process of authenticating that user based on the username. Such authentication could include password-based authentication, certificate-based authentication, two factor authentication, or the like.

Some network resources have their own identity providers. Other network resources permit authentication using any multiple number of identity providers. In that case, the user is given the option of selecting how they would like to sign-in (in other words, which identity provider to use). In more advanced sign-in mechanisms, when there are multiple possible identity providers, the username will be matched against entries of those multiple identity providers. If there is but one identity provider that recognizes that username, the user will be authenticated with that identity provider. If there are multiple identity providers the recognize that username, then the user is asked to select which of those identity providers are to be used to sign-in the user to the network resource.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the automatic selection of an identity provider to be used to authenticate users when requesting access to network resources for a tenant. The network resource may be a resource that the user requests to access over a network such as, for example, an application or web page. When receiving a request from a user to access a network resource, a tenant associated with that network resource is identified. Also, the username provided by the user is identified. The authentication is initiated by checking the username against the directory of the tenant. If that check results in finding an entry for the username in that directory, the entry is checked for an identity provider. If that check results in finding an identity provider, the user is directed to that found identity provider.

Thus, in many, most, or all cases, an identity provider is found and selected for authentication of the user without the user having to manually select the identity provider. In addition to other technical benefits, the automatic selection prevents unnecessary prompting of the user, thereby more efficiently using network bandwidth since the round trip network communication associated with such a prompting is avoided. Furthermore, since the user need not perform the selection via a user interface, processor resources of the client computing system are preserved without having to handle interrupts associated with the user interacting with the user interface to make the selection.

The username may be an internal user of an entity. For instance, the username may be that of an employee of an employer associated with the selected identity provider. Alternatively or in addition, the username may be an external user of one identity provider (e.g., a business guest of the entity that is associated with that identity provider). The selection of the identity provider works in either case since there would still be an entry for that user in the directory of the tenant.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
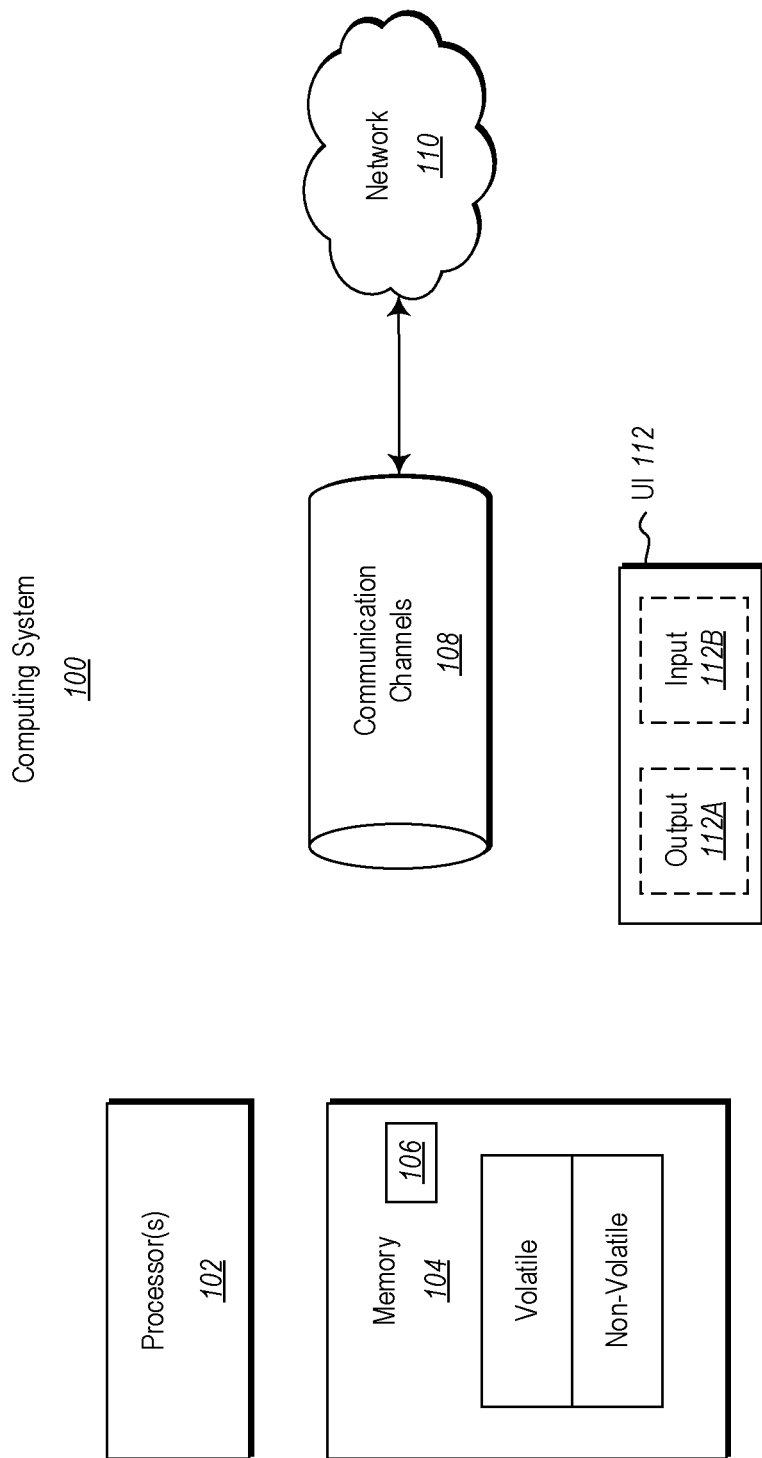
FIG. 1 illustrates an example computer system in which the principles described herein may be employed.

At least some embodiments described herein relate to the automatic selection of an identity provider to be used to authenticate users when requesting access to network resources for a tenant. The network resource may be a resource that the user requests to access over a network such as, for example, an application or web page. When receiving a request from a user to access a network resource, a tenant associated with that network resource is identified. Also, the username provided by the user is identified. The authentication is initiated by checking the username against the directory of the tenant. If that check results in finding an entry for the username in that directory, the entry is checked for an identity provider. If that check results in finding an identity provider, the user is directed to that found identity provider.

Thus, in many, most, or all cases, an identity provider is found and selected for authentication of the user without the user having to manually select the identity provider. In addition to other technical benefits, the automatic selection prevents unnecessary prompting of the user, thereby more efficiently using network bandwidth since the round trip network communication associated with such a prompting is avoided. Furthermore, since the user need not perform the selection via a user interface, processor resources of the client computing system are preserved without having to handle interrupts associated with the user interacting with the user interface to make the selection.

The username may be an internal user of an entity. For instance, the username may be that of an employee of an employer associated with the selected identity provider. Alternatively or in addition, the username may be an external user of one identity provider (e.g., a business guest of the entity that is associated with that identity provider). The selection of the identity provider works in either case since there would still be an entry for that user in the directory of the tenant.

Because the principles described herein operate in the context of a computing system, a computing system will be described with respect to FIG. 1. Then, the principles of automated selection of identity provider to use to authenticate a user will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
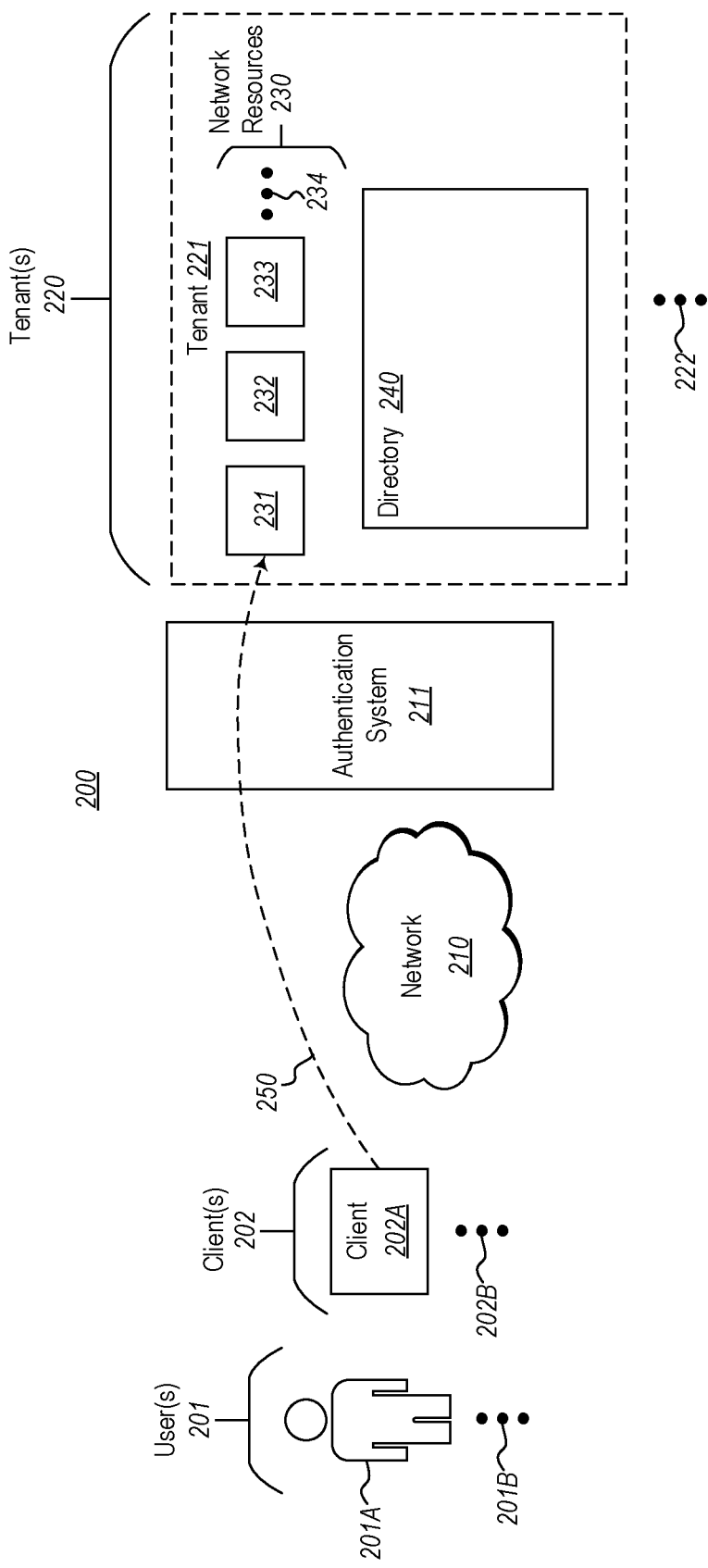
FIG. 2 illustrates an environment in which the principles described herein may be employed, which includes users who is operating respective client computing systems in order to interact over a network to access one of the network resources.

FIG. 2 illustrates an environment 200 in which the principles described herein may be employed. The environment includes users 201 who are operating respectively client computing system 202 in order to interact over a network 210 to access network resources of one or more tenants 220. In order to do that, the respectively client computing system 202 first interacts with an authentication system 211.

In this description and in the claims, a "tenant" is any entity that has multiple users and a directory of those users. A typical tenant might be an enterprise such as a company or organization. Although not required, the tenants may be subscribers to a cloud computing environment, such as a public cloud. A network resource associated with a tenant might be an application or web page that is offered by the tenant or for which the tenant has rights to use. As an example, such network resources may be hosted in a cloud computing environment.

In the illustrated embodiment, only one user 201A is shown interacting with a single client computing system 202A. However, the ellipses 201B and 202B represent that there may be any number of users interacting with any number of client computing systems for purposes of interacting over the network to access any one of the network resources of any one of the tenants 220. The network 210 may be, for instance, the Internet. The client computing system 202A may be structured as described above for the computing system 100 of FIG. 1.

For purposes of simplicity, the tenant(s) 220 that are served by the authentication system 211 is illustrated as including a tenant 221. The principles described herein may be applicable to an authentication system 211 that serves but a single tenant. However, the ellipses 222 represent that the authentication system 211 may serve multiple tenants. The authentication system 211 may provide authentication for access to thousands, millions, or even more tenants when users request their respective network resource. In that case, the authentication system 211 may be provided as an authentication cloud service, and/or as part of the security infrastructure of the cloud computing environment. The authentication system 211 may be a computing system, such as the computing system 100 of FIG. 1.

The tenant 221 is illustrated as having network resources 230. In this example, the tenant network resources 230 are illustrated as having three network resources 231A, 232B and 232C. However, the ellipses 232D represent that there may be any number (one or more) of network resources 230 of the tenant 221 for which the authentication system 211 provides authentication. The network resources 230 for the tenant 221 are shown encompassed within the tenant 221. However, this is merely to symbolize an association between the tenant 221 and its respective network resources 230, and does not imply that the tenant 221 actually hosts the network resources 230 on premises. For instance, as previously mentioned, the network resources 230 of the tenant 221 may be hosted in a cloud computing environment subscribed to by the tenant 221.

Likewise, the tenant 221 is illustrated a including a directory 240. The directory 240 includes multiple entries for users of the tenant 221. The tenant directory 240 is illustrated as being included within the tenant 221 to emphasize the directory 240 is of users of the tenant 221. The directory 240 may be on premises of the tenant 221, but that is not required. The directory 240 may alternative or in addition be present within a cloud computing environment, or some other location external to the premises of the tenant 221. The principles described herein is not limited to the directory 240 or its location, so long as the authentication system 211 can check for the presence of username within the directory, and verify an identity provider for found entries.

Figure 3:
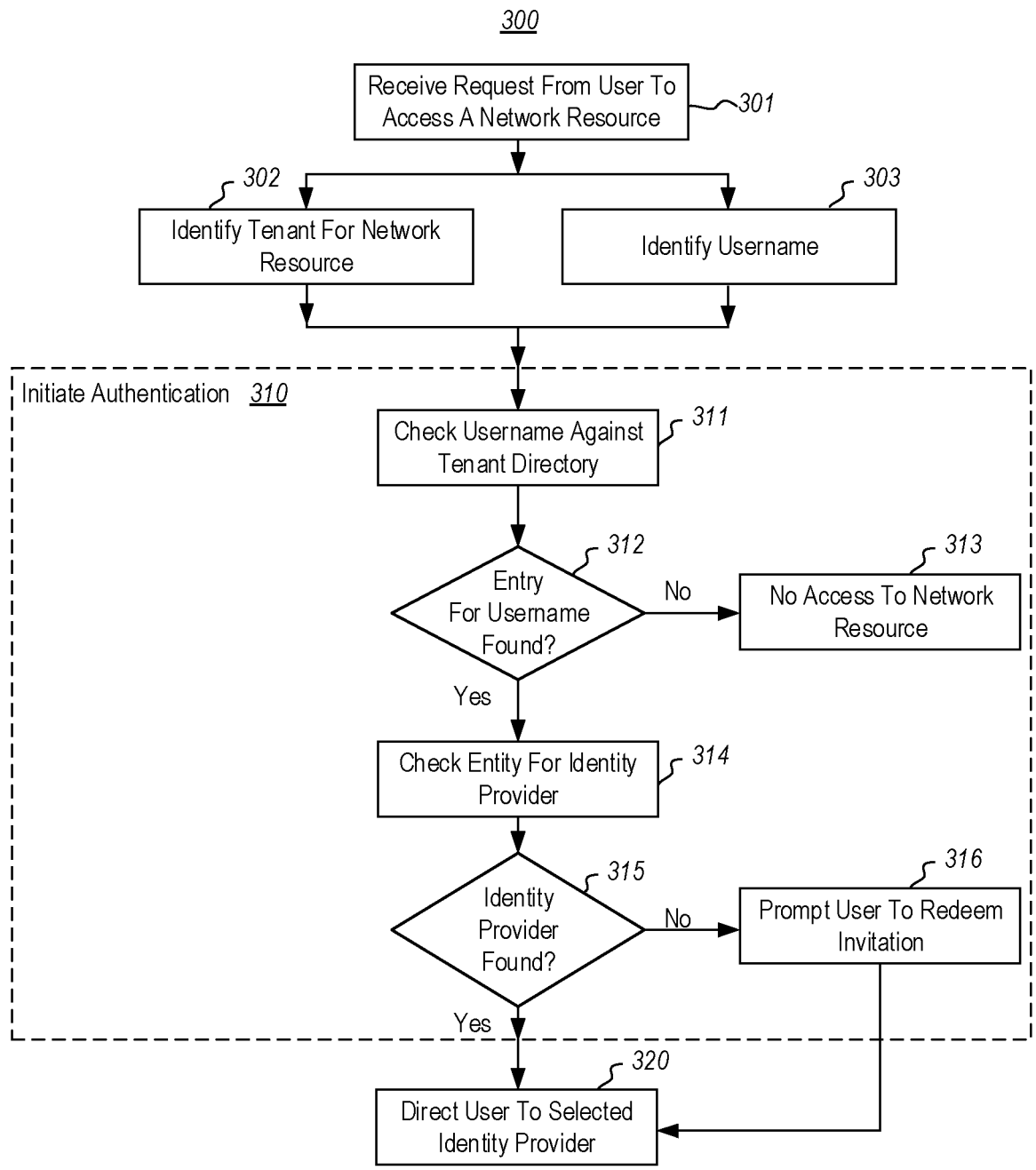
FIG. 3 illustrates a flowchart of a method for automatically attempting selection of an identity provider to be used to authenticate users when the users request access to one or more network resource of a tenant is requested over a network.

FIG. 3 illustrates a flowchart of a method 300 for automatically attempting selection of an identity provider to be used to authenticate users when the users request access to one or more network resource of a tenant is requested over a network. The method 300 may, for instance, be performed in the environment 200 of FIG. 2. For instance, the method 300 may be performed by the authentication system 211 of FIG. 2 each time the authentication system 211 receives a request from one of the users 201 requesting (via their respective client computing system 202) to access one of the network resources of one of the tenants 220. In an example referred to as the "primary example" herein, the user 201A requests access to the network resource 231 of the tenant 221. This is represented by the arrow 250 in FIG. 2. Accordingly, the method 300 of FIG. 3 will be described with frequent reference to the environment 200 of FIG. 2.

The method 300 begins by receiving a request to access a network resource from a user (act 301). For instance, in FIG. 2, as represented by arrow 250 in the primary example, the authentication system 211 receives a request to access network resource 231 from the client computing system 202A. Again, the performance of method 300 may be triggered each time the authentication system 211 receives a request to access a network resource of one of the tenant(s) 220. The method 300 then identifies a tenant associated with a requested network resource (act 302), and identifies the username associated with the user (act 303).

The requested network resource may be identified (act 302) based on information provided within the network request. For instance, context of an identifier (e.g., a uniform resource identifier) of the network resource may be used to identify the associated tenant for that requested network resource. As an example, the network resource may be a uniform resource locator provided in a network request, such as an HTTP request.

When requesting a network resource such as a web page or application, an identifier of the entity that provides the network resource is often included within the uniform resource identifier. For instance, consider an example in which the tenant is a company named Contoso. Now consider that the request from the user is to access the web site contoso.sharepoint.com. This uniform resource identifier tells the authentication system that the user is signing onto Contoso's SHAREPOINT® site. The uniform resource identifier contoso.visualstudio.com tells the authentication system that the user is signing onto Contoso's VISUAL STUDIO® repository. In any case, uniform resource identifiers often take the form YYY.ZZZ.ext, where YYY or ZZZ may represent an identification of an entity associated with the requested resource (an "ext" represents the appropriate extension, such as "com"). In the primary example, suppose that tenant 221 is Contoso, and the authentication system 211 determines that the requested network resource 231 is associated with Contoso.

As for identification of the user (act 303), in the primary example, and in the context of FIG. 2, the user 201A may provide a username when requesting access to the network resource 231. The way in which this username is provided is not critical to the principles described herein. The user 201A could have entered the username directly into the client computing system 202A, selected an icon associated with their username in the client computing system 202A, and/or the like. The user 201A might also simply request access to the network resource 231 while in a particular context at the client computing system 202A, from which context the username is apparent to the authentication system 211 or the client computing system 202A. In any case, the client computing system 202A provides enough information to the authentication system 211 to allow the authentication system 211 to identify a username.

Figure 4:
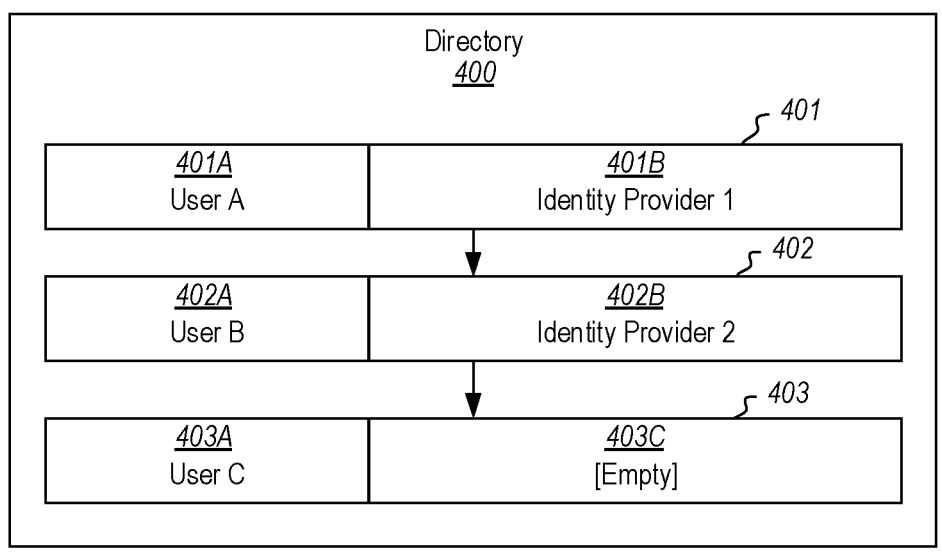
FIG. 4 illustrates an example tenant directory and represents an example of the tenant directory of FIG. 2.

At this point, the method begins authentication (act 310). Authentication is initiated by checking the identified username against a directory of the identified tenant (act 311). For instance, in the primary example, the authentication system 211 would check for the identified username against the tenant directory 240. FIG. 4 illustrates an example tenant directory 400 and represents an example of the tenant directory 240 of FIG. 2. The example tenant directory 400 will be frequently referenced when describing the remainder of the method 300. The example tenant directory includes three entries 401, 402, 403. The username fields 401A, 402A and 403A of the respective entries 401, 402 and 403 identify the username (e.g., "User A", "User B" and "User C") corresponding to the entry. In addition, identity provider fields 401B, 402B and 403 of the respective entries 401, 402 and 403 potentially identify a corresponding identity provider for the username.

Suppose that the identified username was "User D". User D does not appear for any of the usernames 401A, 402A and 403A. Thus, in this case, checking the username "User D" against the directory 400 (act 311) results in no entries being found in the directory ("No" in decision block 312). In this case, authentication fails. Moreover, it is inappropriate for the user to have access to the tenant's network resource. Accordingly, the method 300 abstains from granting access to the requested network resource (act 313).

On the other hand, if the check results in finding an entry for the identified username in the tenant directory ("Yes" in decision block 312), then the method 300 continues further. For instance, in the case of the primary example, and referring to the tenant directory 400 of FIG. 4, the authentication would continue if the identified username was "User A", "User B", or "User C", since there would be a respective entry (e.g., entry 401, 402, 403) found in the tenant directory 400 ("Yes" in decision block 312).

Next, if an entry is found for that username ("Yes" in decision block 312), the method 300 checks the found entry for an identity provider (act 314). If an identity provider is found within the entry ("Yes" in decision block 315), then the user is directed towards that identity provider for authentication (act 320). In this case, the user need not provide a selection of the identity provider. Instead, the authentication system selected the identity provider automatically without requiring prompting of the user. As an example, if the username was "User A", then the authentication system would evaluate entry 401 to automatically select "Identity Provider 1", which the authentication system would then direct the user to for authentication. If the username was "User B", then the authentication system would evaluate entry 402 to automatically select "Identity Provider 2", which the authentication system would then direct the user to for authentication.

Suppose, however, that the username was "User C". In the primary example, and referring to FIG. 4, there is an entry (entry 403) in the tenant directory 400 associated with User C ("Yes" in decision block 312). Thus, that entry 403 would be checked for the identity provider (act 314). However, the identity provider field 403B is empty. Thus, checking the entry (act 314) does not result in finding an identity provider for that user ("No" in decision block 315). In this embodiment, that may mean that the user has a pending invitation that the user has not yet redeemed or accepted. Therefore, the user is taken through an invitation redemption flow (act 316). In this case, the user might be presented with one more identity provider options to pick for purposes of redeeming the invitation. The authentication system might then honor the user selection, and direct the user to the selected identity provider (act 320).

The principles described herein may also accommodate external users as well as internal users of a tenant. For instance, the internal user may be an employee or permanent contractor of the enterprise. Internal users will already have an entry in the tenant directory by definition.

An external user may be an individual for whom some level of access to the resources of the enterprise has been granted. For instance, the external user might be an accounting firm that has been given charge by the enterprise to perform an external audio of the finances of the enterprise. In any collaboration environment, it is sometimes quite helpful to grant temporary access to files, just as it is quite helpful to grant non-employees temporary physical access to the campus of the enterprise once they present to the receptionist some form of identification, and confirm with an enterprise employee that they are expecting that guest. Such external users are often termed "business guests".

For external users, an invitation to join the tenant is provided to the external user. If the external user requests access to a network resource before the invitation to join the tenant is sent, then this will result in the external user not being granted access to the network resource (act 313) since there would be no entry for the external user in the tenant database ("No" in decision block 312). If the external user requests access to a network resource after the invitation to join the tenant is sent, then in systems that wait to create an entry in the tenant database until the invitation is redeemed, there will still not be an entry for that external user in the tenant database ("No" in decision block 312). Accordingly, the external user would still not be granted access to the requested network resource (act 313). In fact, in these cases, the term "external user" may be a misnomer, for the individual is not even an external user yet, since there is no entry for them in the tenant database.

On the other hand, suppose again that an external user has been extended an invitation to join the tenant, but has not yet redeemed the invitation, which involves authenticating themselves through an identity provider. However, this time, suppose that an entry is created in the tenant database once an invitation is sent (rather than waiting for acceptance). In this case, if the user were to request access to the network resource, an entry would be found in the tenant database ("Yes" in decision block 312). However, there still would not be an identity provider identified for that user since the identity provider used to redeem the invitation would not be populated into that identity provider field yet ("No" in decision block 315). In that case, the user might then be prompted to redeem the invitation (act 316) by selecting the identity provider.

In any case, once the invitation is redeemed, the identity provider used to redeem is added to the identity provider field for the entry. Thus, a business guest that has already redeemed an invitation to join the tenant will be recognized and caused to be directed to the identity provider previously used to gain access to the tenant without again having the user be prompted to identify the identity provider.

Thus, the authentication system 211 acts appropriately for both internal users and business guests, and may even facilitate redeeming an invitation for a business user. Furthermore, in the vast majority of cases in which the username is found in the tenant directory ("Yes" in decision block 312) and in which an identity provider is found in that entry ("Yes" in decision block 315), the user is not prompted to select the identity provider used to provide the identity for the user.

In addition to other technical benefits, the automatic selection prevents unnecessary prompting of the user, thereby more efficiently using network bandwidth since the round trip communication associated with such a prompting is avoided. It also may avoid an improper selection of the identity provider by the user, which may result in the user having more restrictive access to the network resource than necessary. Furthermore, since the user need not perform the selection via a user interface, processor resources of the client computing system are preserved without having to handle interrupts associated with the user interacting with the user interface to make the selection.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having stored thereon computer-executable instructions that are structured such that, when executed by the one or more processors, cause the computing system to perform a method for automatically attempting selection of an identity provider to be used to authenticate users when the users request access to one or more network resource is requested over a network, the method comprising the following for each of a plurality of user requests to access:
   receiving a user request for accessing a network resource, the request including an identifier of the network resource and a username; initiating authentication of the user by performing the following:
   based on the identifier of the network resource, accessing a directory containing a plurality of entries for a plurality of users authorized to access the network resource, each of the plurality of entries including a username and a corresponding identity provider;
   checking the username against the directory of the network resource;
   upon finding an entry for the username in the directory of the network resource,
      checking the entry for a corresponding identity provider; and
      upon finding the corresponding identity provider, automatically directing the user to the corresponding identity provider; or
   upon not finding an entry for the username in the directory of the network resource, abstaining from granting access to the requested network resource.

2. The computing system in accordance with claim 1, wherein if the checking the entry for an identity provider does not result in finding an identity provider, the method includes causing the user to redeem an invitation to join the directory of the network resource.

3. The computing system in accordance with claim 2, the method further comprising:
   adding an identification of the identity provider that the user used to redeem the invitation to the entry.

4. The computing system in accordance with claim 2, the causing the user to redeem the invitation comprising:
   presenting at least one identity provider option to the user;
   detecting user selection of one of the at least one identity provider options presented to the user; and
   causing the user to be directed towards the selected identity provider for redeeming the invitation.

5. The computing system in accordance with claim 2, the causing the user to redeem the invitation comprising:
   presenting a plurality of identity provider options to the user;
   detecting user selection of one of the plurality of identity provider options presented to the user; and
   causing the user to be directed towards the selected identity provider for redeeming the invitation.

6. The computing system in accordance with claim 1, wherein if the checking the entry for an identity provider does not result in finding an identity provider, the method includes causing the user to redeem an invitation to join the directory of the network resource.

7. The computing system in accordance with claim 6, the method further comprising:
   adding an identification of the identity provider that the user used to redeem the invitation to the entry.

8. The computing system in accordance with claim 6, the causing the user to redeem the invitation comprising:
   presenting at least one identity provider option to the user;
   detecting user selection of one of the at least one identity provider options presented to the user; and
   causing the user to be directed towards the selected identity provider for redeeming the invitation.

9. The computing system in accordance with claim 6, causing the user to redeem the invitation comprising:
   presenting a plurality of identity provider options to the user;
   detecting user selection of one of the plurality of identity provider options presented to the user; and
   causing the user to be directed towards the selected identity provider for redeeming the invitation.

10. A method for automatically attempting selection of an identity provider to be used to authenticate users when the users request access to one or more network resource is requested over a network, the method comprising the following for each of a plurality of user requests to access:
    receiving a user request for accessing a network resource, the request including an identifier of the network resource and a username;
    initiating authentication of the user by performing the following:
    based on the identifier of the network resource, accessing a directory containing a plurality of entries for a plurality of users authorized to access the network resource, each of the plurality of entries including a username and a corresponding identity provider;
    checking the username against the directory of the network resource;
    upon finding an entry for the username in the directory of the network resource,
       checking the entry for a corresponding identity provider; and
       upon finding the corresponding identity provider, causing the user to be directed to the corresponding identity provider for authentication or, alternatively, upon failing to find the corresponding identity provider when checking for the entry, taking the user through an invitation redemption flow; or
    upon not finding an entry for the username in the directory of the network resource, abstaining from granting access to the requested network resource.

11. The method in accordance with claim 10, the method further comprising:
    adding an identification of the identity provider that the user used to redeem the invitation to the entry.

12. The method in accordance with claim 10, the causing the user to redeem the invitation comprising:
    presenting at least one identity provider option to the user;
    detecting user selection of one of the at least one identity provider options presented to the user; and
    causing the user to be directed towards the selected identity provider for redeeming the invitation.

13. The method in accordance with claim 10, the causing the user to redeem the invitation comprising:

presenting a plurality of identity provider options to the user;

detecting user selection of one of the plurality of identity provider options presented to the user; and causing the user to be directed towards the selected identity provider for redeeming the invitation.

14. The method in accordance with claim 10, the user being an external user of the network resource.

15. The method in accordance with claim 10, the method further comprising adding the one or more entries with an identification of the identity provider only after an invitation for authenticating the user is redeemed.

16. The method in accordance with claim 10, the method further comprising:

adding an identification of the identity provider that the user used to redeem the invitation to the entry.

17. The method in accordance with claim 10, the causing the user to redeem the invitation comprising:

presenting at least one identity provider option to the user;

detecting user selection of one of the at least one identity provider options presented to the user; and causing the user to be directed towards the selected identity provider for redeeming the invitation.

18. The method in accordance with claim 10, the causing the user to redeem the invitation comprising:

presenting a plurality of identity provider options to the user;

detecting user selection of one of the plurality of identity provider options presented to the user; and causing the user to be directed towards the selected identity provider for redeeming the invitation.

19. A computer program product comprising one or more computer-readable hardware storage devices having stored thereon computer-executable instructions that are structured such that, when executed by one or more processors, cause a computing system to perform a method for automatically attempting selection of an identity provider to be used to authenticate users when the users request access to one or more network resource, the method comprising the following for each of a plurality of user requests to access:

receiving a user request for accessing a network resource, the request including an identifier of the network resource and a username; initiating authentication of the user by performing the following:

based on the identifier of the network resource, accessing a directory containing a plurality of entries for a plurality of users authorized to access the network resource, each of the plurality of entries including a username and a corresponding identity provider;

checking the username against the directory of the network resource, the directory including one or more entries, each of the one or more entries being added to the directory only after one or more corresponding invitations associated with the one or more entries is first sent to one or more corresponding users to join the directory of the network resource;

upon finding an entry for the username in the directory of the corresponding resource, checking the entry for a corresponding identity provider; and upon finding the corresponding identity provider, causing the user to be directed to the corresponding identity provider for authentication; or upon not finding an entry for the username in the directory of the network resource, abstaining from granting access to the requested network resource.

* * * * *